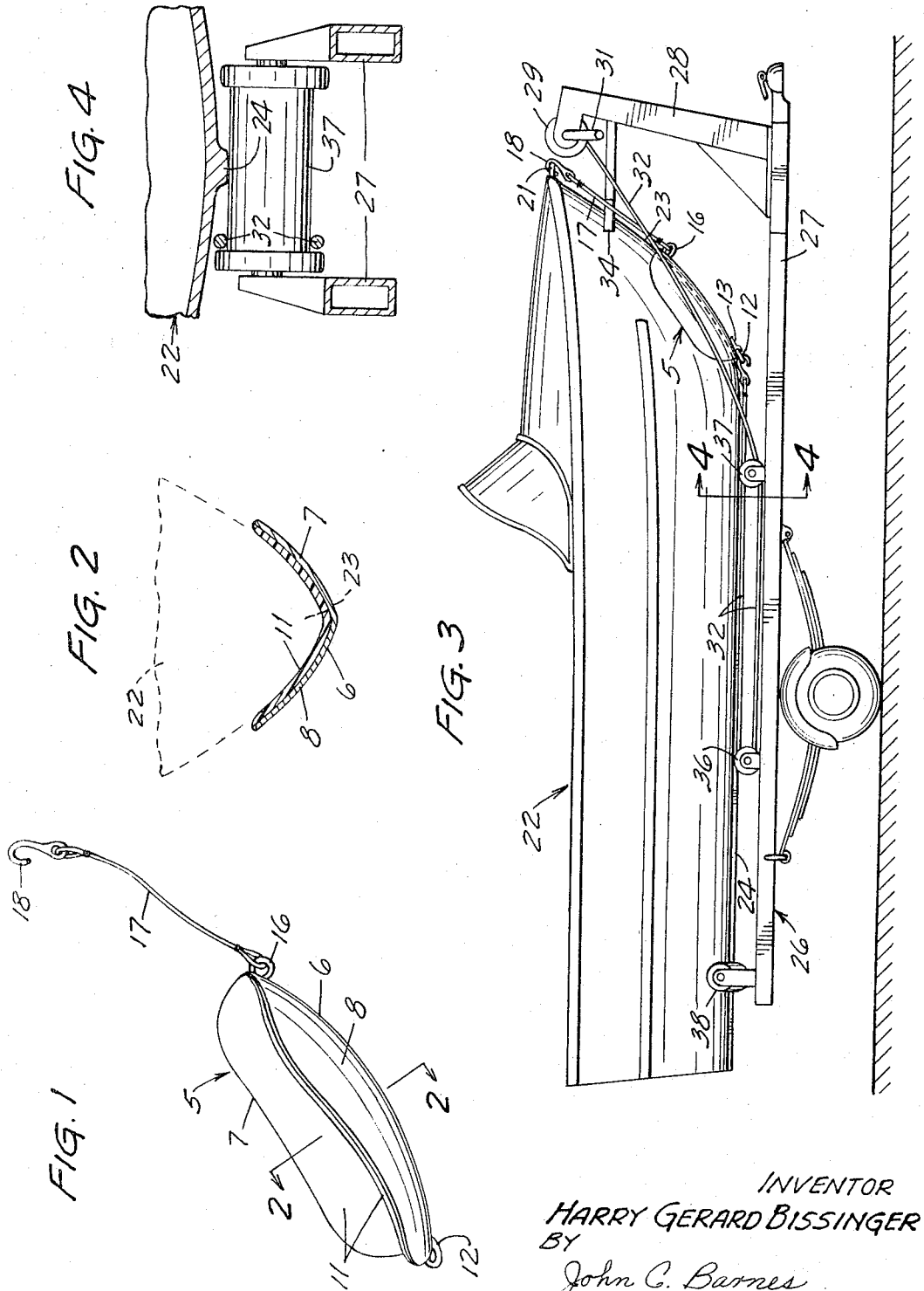
Feb. 14, 1967     H. G. BISSINGER     3,303,952
BOAT LAUNCHING ACCESSORY
Filed Feb. 8, 1965
INVENTOR
HARRY GERARD BISSINGER
BY
John C. Barnes
ATTORNEY

3,303,952
BOAT LAUNCHING ACCESSORY
Harry Gerard Bissinger, Maine Township, Ottertail County, Minn. (Underwood, Minn. 56586)
Filed Feb. 8, 1965, Ser. No. 430,894
10 Claims. (Cl. 214—517)

This invention relates to an adjuvant boat accessory, and in one aspect a device readily fitted on and separable from a boat and adapted for use in the launching of a said boat from a transport.

Most boat trailers in use today are provided with a winch on the front for use in the loading of boats thereon. Few trailers, on the other hand, are constructed to provide any means to aid in launching the boat from the trailer and therefore, when the desired launching area is not steeply inclined or in any manner specifically adapted for launching, considerable effort must be exerted by the prospective boater to get the boat off the trailer.

As mentioned, a few trailers are constructed to provide some facility to aid in launching a boat and one such trailer is illustrated in United States Patent No. 2,960,246, issued to Charles D. Lovelace. The trailer of the Lovelace patent has as an integral part of the trailer an I beam extending the length of the trailer and longitudinally of the axis of the trailer frame. An upright carriage is mounted on the I beam for travel therealong and has a winch mounted on said carriage in addition to the winch on the forward end of the trailer. This construction results in a trailer which is considerably heavier than most conventional trailers and adds considerably to the cost of the trailer, neither of which is appreciated by the vastly increasing boating public.

A device formed in accordance with the present invention affords an aid in the launching of boats which is both inexpensive and of insignificant weight. The present invention provides a novel device which requires a minimum amount of effort on the part of the boater to launch a boat at any desired launch site.

The device provided by the present invention has the advantage of being usable with conventional trailers without requiring that the trailer undergo any reconstruction, remodeling or additions.

The novel device of the present invention has as a further advantage the fact that it is readily attachable to the boat when launching the same and readily removable after the boat is launched.

Additionally, the novel device is adapted to be readily transferred from boat to boat to launch any boat from almost all trailers in use today, and particularly all trailers which are provided with a forwardly disposed winch.

The present invention eliminates the need for an inclined launch site and provides an accessory comprising a body member adapted to conform to or fit around the prow of the boat having means on one end of said body member to which the trailer winch cable may be attached, and connecting means secured to said body member and adapted to fasten the accessory to the bow of a boat and position said means on one end of said body member adjacent to the lower prow of the boat. The fact of the body member engaging the prow may be lined with a suitable covering to protect the boat.

The above and other features will become more apparent upon a perusual of the following detailed description which refers to the accompanying drawing wherein:

FIGURE 1 is a perspective view of a preferred embodiment of the device constructed in accordance with the present invention;

FIGURE 2 is a sectional view taken generally along the line 2—2 of FIGURE 1 and shows the outline of the prow of a boat in broken lines;

FIGURE 3 is a side elevational view of a trailer, having a boat loaded thereon, and having a device constructed in accordance with the present invention fitted on the prow of the boat and with the cable of the trailer winch positioned and secured to the device to launch the boat; and FIGURE 4 is a partial sectional view taken generally along the line 4—4 of FIGURE 3.

Referring now to the drawing, the boat accessory, generally designated 5, includes an elongated body member 6 which is arcuate in the lengthwise direction to conform to the general curve of the prow on most pleasure boats. The body member 6 has two symmetrical side portions 7 and 8 which are arcuate in the lengthwise and transverse directions. The portions 7 and 8 join along the center portion of the body member 6 and diverge from said center portion to form a concave inner face generally V-shaped in cross-section. This cross-section varies along the length of the body member with the V having a wider angle at the upper end than at the lower end to correspond generally to the configuraton of a lower porton of the prow of most boats. The concave face is lined with a suitable covering 11 to prevent the accessory 5 from marring the boat hull.

Means are provided at one end of the body member 6, substantially on the center line thereof to permit a cable to be attached to said body member. As illustrated this means is an eye 12 formed by a separate ring movably affixed to the body member as by a bracket 13. The eye 12 is preferably positioned relative to the body member 6 to lie along the lower prow of a boat.

Attaching means are provided at the other end of the body member 6 affording easy attachment of the accessory 5 to the boat in a manner allowing a pulling force to be exerted on said accessory and imparted to the boat and also affording easy removal. The attaching means as illustrated comprises an eye 16 provided at the other or upper end of the body member 6, as shown in FIGURES 1 and 3, a length of rope 17 secured at one end thereof to the eye 16 and a hook 18 fixed to the opposite end of the rope. The eye 16 is illustrated in the form of a ring connected to the body member by welding. The rope 17 is preferably made of polymeric material such as polyethylene which will withstand the tensile stress applied thereto, but may alternatively be a metal rod, cable or a chain. The hook 18 affords a simple connect and disconnect means with the bow ring on the prow of the boat.

As shown in FIGURE 3, the rope 17 has a length such that, when the hook 18 is fastened in a bow ring 21 on a boat 22, the body member 6 will be suspended thereby to a position with the eye 12 adjacent to the lower portion of the prow 23, but with no portion of the accessory extending lower than the keel 24 of said boat 22.

The boat trailer 26 shown in FIGURE 3 exemplifies the most typical commercially available trailer and includes a frame 27 with an upright 28 mounted on the forward end thereof and terminating at said forward end in a conventional ball-hitch member. A winch including a rotatable drum 29 is mounted on the upright 28 and is rotated by a crank 31 to wind a winch cable 32 upon the drum. The winch permits the operator to load the boat 22 on the trailer 26 by aligning the boat with the rear of the trailer and connecting the free end of the cable 32, generally terminating in a hook, to the bow ring 21 on the prow of the boat. The cable 32 is then wound by means of the drum 29 to a position where the prow of the boat is drawn into snug engagement with a bracket 34 or other suitable cushioning device fixed to the upright 28 below the winch. In this position the boat keel 24 is supported on several rollers such as 36 and 37 mounted centrally on the trailer and upon other suitable boat supporting means such as a pair of transversely spaced rollers 38 (one of which is shown in FIGURE 3) on the rear of the trailer 26.

In launching the boat 22 from the trailer 26 the operator disconnects the cable 32 from the bow ring 21 and unwinds the same from the winch drum 29 sufficiently to draw said cable under forward roller 37 and under and around rearward roller 36. The hook 18 of the accessory 5 is fastened in the bow ring 21 and the main body portion 6 is positioned to symmetrically fit the prow 23 of the boat. The free end of cable 32 is then connected to the eye 12. Upon operation of the winch drum 29 by the crank 31, the cable is rewound thereon, and as the cable is tightened the continued rotation of the drum exerts a pull on the accessory 5 and consequently to boat 22 moving the same rearwardly to a position sufficient to launch the same from the trailer.

The cable 32 may be passed around rollers existing on most commercially available trailers which support the boats, as illustrated in FIGURES 3 and 4, or, if such rollers are not provided, the cable may be drawn around other trailer structural members positioned generally centrally of and rearwardly on the trailer. The addition of pulleys or rollers onto a trailer may also be possible if an existing trailer is not provided with either sufficient rollers or structural members. Instances where such additional pulleys or rollers would be necessary, however, are infrequent.

The covering 11 on the concave face of the body member 6 may be any of a wide variety of materials or combinations thereof, i.e., foam rubber, vinyl foam or sponge, polyurethane foam or sponge, carpeting or fibrous mat, or natural sponge, each of which could be adhesively secured to said face. If the covering 11 has sufficient thickness and is supple it will fit the contour of the boat prow more snugly, making an accessory 5 more readily adapted for use with a still wider variety of boats.

The main body member 6 may be formed as an integral member as by stamping, welding, molding or by any other well known manufacturing technique and may be formed of any suitable material which will withstand the tensile stresses applied to the body member during launching. Such materials may include stainless sheet steel or other metals, plastics or resins which preferably are reinforced, wood or combinations of materials such as plastic in combination with a rope, cable, metal bar or rod in the longitudinal center line of the main body member with a loop or ring at both ends of such rope, cable, metal bar or rod. The materials used in the body member may vary from extremely stiff to flexible. The eyes 12 and 16 could be formed as openings in the body member 6 during the stamping or molding thereof or they can take the form of an eye bolt or other conventional attaching means affixed to said body member. A pulley may be attached to the lower end of the main body member to produce a block and tackle effect.

Having thus described a preferred embodiment of a device made in accordance with my invention and its use in the launching of a boat, together with several variations, it is to be understood that any and all changes and modifications of the said device which would be obvious to one skilled in the art after reading this description are contemplated as may come within the scope of the appended claims.

What I claim as my invention is:

1. A device which is readily attachable and removable from a boat when launching a boat from a trailer having winch means on the forward end including a rotatable drum, a length of cable, and a crank, said device comprising an elongated body member which is arcuate in the longitudinal direction and which has a varying cross-section from one end to the other to fit symmetrically over a lower portion of the prow of a boat, an eye located centrally at one end of said body member and adapted to receive the free end of a said winch cable, and a length of rope connected to the other end of said body member to fasten the body member to the bow ring of a said boat.

2. An adjuvant device when unloading boats from trailers having a forwardly disposed winch including a rotatable drum, a length of cable attached to said drum, and a crank, said device comprising an elongated body member having an arcuate configuration adapted to conform to and fit symmetrically over at least a portion of the prow of the boat, means defining an eye at each end of said body member, the eye at one end being adapted to receive the free end of a said cable after the cable is drawn from a said drum under and around a roller positioned rearwardly on the trailer, and a length of rope connected to the eye at the other end of said body member affording means to connect said body member to the bow of the boat such that upon reception of the cable and connection of the body member, rotation of a said crank to wrap the cable upon the winch drum will move the boat rearwardly off the trailer.

3. An adjuvant device when unloading boats from trailers having a winch on the forward end including a rotatable drum, a length of cable attached to said drum, and a crank, said device comprising an elongated body member having an arcuate configuration in the lengthwise and transverse direction defining a concave face, said body member being adapted to receive a portion of the prow of a boat against said concave face, a first eye at one end of said body member adapted to receive the free end of a said cable when said cable is drawn from a said drum under and around a roller positioned rearwardly on the trailer and back to said eye, a second eye at the other end of the body member, a length of rope having one end connected to said second eye, and hook means on the other end of said rope to fasten said body member to the bow of the boat, said rope having a length sufficient to position said body member adjacent to the lower portion of the prow but short enough so the device does not extend below the keel of a said boat whereby when a said cable is so connected and said body member is so fastened rotation of a said crank to exert a rearward pull on the first eye will launch the boat from the trailer.

4. A device which is readily attachable and removable from a boat to aid in launching a boat from a trailer having winch means including a rotatable drum, a length of cable, and a crank, said device comprising an elongated body member having an arcuate configuration in the lengthwise direction and generally V-shaped in cross-section affording thereby a concave face adapted to receive a substantial portion of the prow of a boat, a first eye at one end of said body member to lie generally along the lower prow of a said boat when said body member is fitted to the boat and adapted to receive the free end of a said winch cable after said cable is drawn from a said drum under and around a roller positioned rearwardly on the trailer and back to said first eye, a second eye at the other end of the body member, a length of rope having one end connected to the second eye, means on the other end of said rope for connecting said rope and thereby said body member to the bow of the boat, the length of the rope being sufficient to position said body member adjacent to the lower portion of the prow of the boat but short enough so the device does not extend below the keel of a said boat such that upon rotation of a said crank to wrap the winch cable upon the winch drum, the boat will be launched from the trailer, and a covering on said concave surface of said body member to avoid marring the boat.

5. A portable boat launching adjuvant for use when unloading a boat from a trailer, said adjuvant comprising a body member which is generally V-shaped in cross-section and has a length to fit a portion of the prow of a said boat, attaching means affixed to said body member generally centrally at and to each end of said body member for attaching one said end of said body member to the bow ring of a said boat and positioning said body member adjacent the lower prow of the boat and for attaching one end of a winch cable drawn under and around a rear member of a said trailer to the other said end of said body member.

6. An adjuvant as defined in claim 5 wherein said attaching means comprises a flexible tension member having a hook at one end for easy attachment of said body member to a bow ring on a boat.

7. An adjuvant as defined in claim 5 wherein said attaching means comprises a hook; a rope, said rope being connected to said one end of said body member and to said hook; and an eye connected to said other end of said body member for attachment to one end of a said winch cable.

8. A portable boat launching adjuvant for use when unloading a boat from a trailer, said adjuvant comprising an elongated body member which is generally V-shaped in cross-section and arcuate in the lengthwise direction to conform to the general curve of the lower prow of a said boat, attaching means affixed to said body member generally centrally at and to each end of said body member for attaching one said end of said body member to the bow ring of a said boat when said body member is fitted over the lower prow of the boat and for attaching one end of a winch cable drawn under and around a rear member of a said trailer to the other said end of said body member.

9. The method of launcring a boat having fastening means affixed to the upper portion of the prow thereof from a boat trailer having boat supporting rollers, a winch and a length of cable, one end of which is attached to said winch, comprising the steps of attaching one end of an elongated body member shaped to conform to the prow of a boat to said fastening means, positioning said body member adjacent the lower portion of the prow of said boat, positioning said cable along the bottom of said boat and above said boat supporting rollers of said trailer to place the other end of said cable adjacent the prow, connecting said other end of said cable to the other end of said body member, and rotating said winch to tension said cable for exerting a pulling force on said body member to move the boat relative to said rollers on said trailer and toward the rear of said trailer.

10. The method of launching a boat having a conventional bow ring from a trailer having boat supporting rollers, a forwardly disposed winch drum and a cable, one end of said cable being attached to said winch drum, comprising the steps of attaching one end of an arcuate elongated body member which is V-shaped in cross-section and has attaching means provided at each end thereof to the bow ring of said boat, positioning said body member to fit the lower portion of the prow of said boat, drawing the cable off the winch drum under the trailer and up over a rear member thereof and along the bottom of the boat to position the other end of said cable adjacent the other end of said body member, attaching said other end of the cable to the other of said attaching means, rotating the winch drum to tension said cable and exert a rearward pull on prow of the boat.

References Cited by the Examiner

UNITED STATES PATENTS

| | | | |
|---|---|---|---|
| 2,957,593 | 10/1960 | Evans | 214—506 |
| 3,038,617 | 6/1962 | Seegrist | 214—85.5 |
| 3,097,755 | 7/1963 | Fulcher | 214—505 |
| 3,149,735 | 9/1964 | Bleecker | 214—85.5 |

ALBERT J. MAKAY, Examiner.

GERALD M. FORLENZA, Primary Examiner.